(12) United States Patent
Koga (10) Patent No.: US 7,212,491 B2
(45) Date of Patent: May 1, 2007

(54) QOS CONTROL MIDDLEWARE IN INTEGRATED NETWORK, QOS CONTROL METHOD, AND THE PROGRAM FOR THE SAME

(75) Inventor: Takahiro Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 1105 days.

(21) Appl. No.: 10/106,036

(22) Filed: Mar. 27, 2002

(65) Prior Publication Data

US 2002/0141446 A1    Oct. 3, 2002

(30) Foreign Application Priority Data

Mar. 30, 2001 (JP) .............................. 2001-098456

(51) Int. Cl.
*H04J 3/14*     (2006.01)
*H04L 12/66*    (2006.01)

(52) U.S. Cl. ..................... 370/229; 370/252; 370/468
(58) Field of Classification Search ............... 370/468, 370/229, 252, 230, 230.1
See application file for complete search history.

(56) References Cited

U.S. PATENT DOCUMENTS

| | | | |
|---|---|---|---|
| 5,583,857 A * | 12/1996 | Soumiya et al. ............ 370/233 |
| 6,614,781 B1 * | 9/2003 | Elliott et al. ................ 370/352 |
| 6,658,512 B1 * | 12/2003 | Gokulrangan ............... 710/117 |
| 6,738,819 B1 * | 5/2004 | Li et al. ..................... 709/229 |
| 7,039,049 B1 * | 5/2006 | Akgun et al. ............... 370/389 |
| 2002/0138643 A1 * | 9/2002 | Shin et al. .................. 709/232 |
| 2004/0203714 A1 * | 10/2004 | Van Lieshout et al. ..... 455/423 |
| 2005/0149981 A1 * | 7/2005 | Augenbraun et al. ....... 725/112 |

* cited by examiner

*Primary Examiner*—Min Jung
(74) *Attorney, Agent, or Firm*—McGinn IP Law Group, PLLC (57) ABSTRACT

An integrated QoS control system is provided that transmits, in real time, the stream data between a bandwidth-guaranteed network and a bandwidth-not-guaranteed network. The QoS manager 102 records the remaining bandwidth of the bandwidth-guaranteed network 2 captured by the remaining bandwidth table capturer 103 and the remaining bandwidth of the bandwidth-not-guaranteed network 1 calculated with traffic information notified by the network status monitor 107 on the use bandwidth registration table 104 (for comprehensively managing the bandwidth of an integrated network). The Qos manager 102 converts a QoS parameter received via the QoS request receiver 106 into a traffic parameter and controllably adapts the value of the traffic parameter to a service quality required by the application 109.

22 Claims, 8 Drawing Sheets

QOS CONTROL MIDDLEWARE IN INTEGRATED NETWORK, QOS CONTROL METHOD, AND THE PROGRAM FOR THE SAME

BACKGROUND OF THE INVENTION

The present invention relates to an integrated network QoS (Quality of Service (referred to as "QoS")) control system that manages and controls a bandwidth and the QoS in an integrated network. In the integrated network, data is transmitted between a bandwidth-guaranteed network and a bandwidth-not-guaranteed network (or a bandwidth-guaranteed network and a bandwidth-not-guaranteed network are inter-linked and communications can be conducted between a terminal on the bandwidth-guaranteed network and a terminal on the bandwidth-not-guaranteed network inter-linked).

Related Art

A conventional technique related to an integrated network in which a bandwidth-guaranteed network and a bandwidth-not-guaranteed network are interlinked will be explained referring to FIG. 8.

Figure 8:
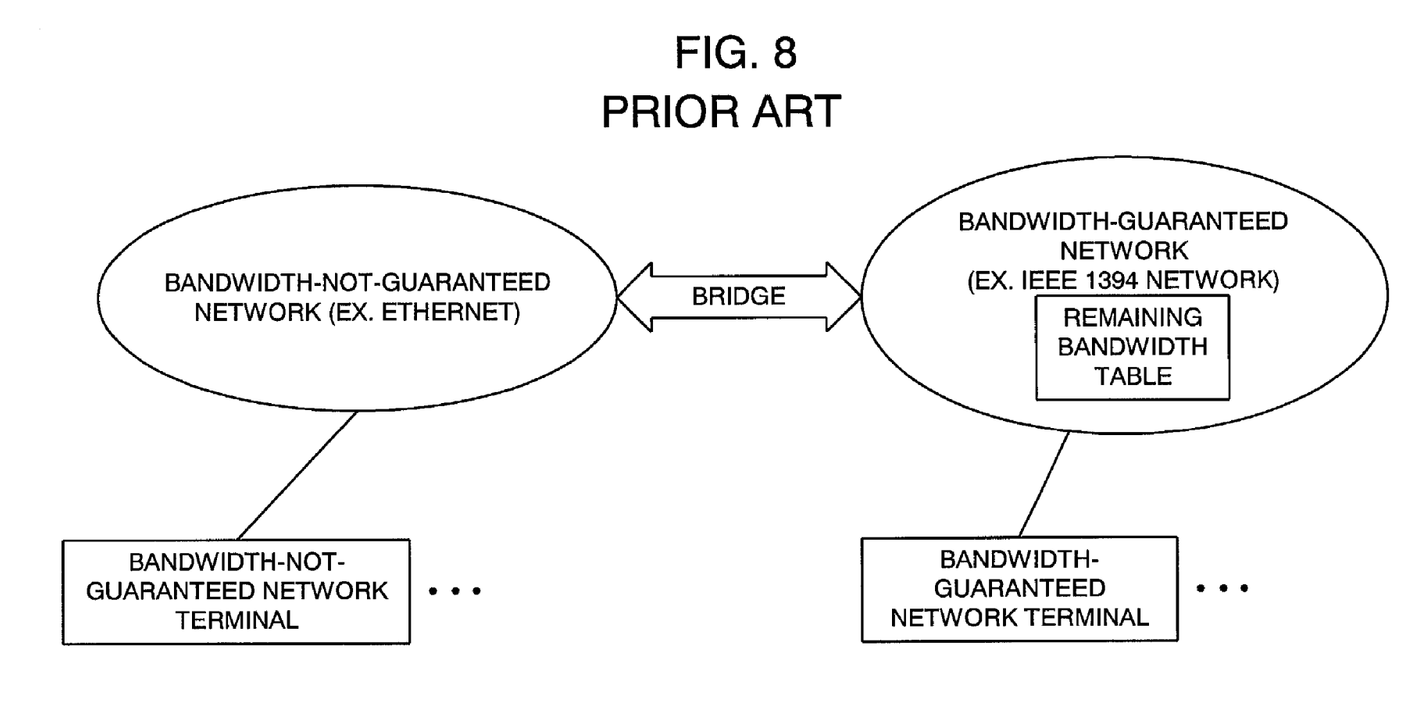
FIG. 8 is a block diagram explaining a conventional art.

Referring to FIG. 8, a bandwidth-not-guaranteed network (for example, Ethernet) is the network that does not guarantee the bandwidth during data transmission.

A bandwidth-guaranteed network (for example, IEEE (Institute of Electrical and Electronic Engineers) 1394 network) is the network that guarantees the bandwidth during data transmission.

A remaining bandwidth table is the table on which a usable bandwidth (referred to as "remaining bandwidth") in a bandwidth-guaranteed network is stored in a table format on, for example, a memory.

A bridge is a device that has the function of conducting communications between a bandwidth-guaranteed network and a bandwidth-not-guaranteed network. The bridge can establish communications between a terminal connected on a bandwidth-guaranteed network (or a bandwidth-guaranteed network terminal) and a terminal connected on a bandwidth-not-guaranteed network (or a bandwidth-not-guaranteed network terminal).

In the prior art, when communications between a terminal connected to a bandwidth-guaranteed network and a terminal connected to a bandwidth-not-guaranteed network are conducted via a bridge, the bandwidth of the bandwidth-not-guaranteed network is not guaranteed.

In the prior art, the problem is that it is difficult to transmit stream data, for example, moving image data, in real time.

SUMMARY OF THE INVENTION

The present invention is made to solve the above-mentioned problems.

An object of the present invention is to provide an integrated network QoS control system capable of transmitting, in real time, stream data between a bandwidth-guaranteed network and a bandwidth-not-guaranteed network. Thus, when communications are conducted between a terminal connected on a bandwidth-guaranteed network and a terminal connected to a bandwidth-not-guaranteed network (or when communications are conducted in an integrated network including a bandwidth-guaranteed network and a bandwidth-not-guaranteed network), a QoS middleware manages and controls the bandwidth and QoS.

The present invention is accomplished by a QoS control middleware in an integrated network QoS control system including a bandwidth-guaranteed network and a bandwidth-not-guaranteed network, comprising a use bandwidth registration table for recording a remaining bandwidth of each of the bandwidth-guaranteed network, the bandwidth-not-guaranteed network, and the integrated network and comprehensively managing a bandwidth of the integrated network; a remaining bandwidth table capturer for capturing data representing a usable remaining bandwidth of the bandwidth-guaranteed network from a remaining bandwidth table on said bandwidth-guaranteed network; and a network status monitor for monitoring a traffic status of the bandwidth-not-guaranteed network and issuing the traffic information; and a QoS manager performing for recording the remaining bandwidth of the bandwidth-guaranteed network captured by the remaining bandwidth table capturer and the remaining bandwidth of the bandwidth-not-guaranteed network calculated with traffic information notified by the network status monitor, to the use bandwidth registration table mathematically converting a QoS parameter received from an application via a QoS request receiver into a traffic parameter, notifying the application of the traffic parameter, controlling the value of the traffic parameter so as to adapt a service quality required by the application, and controllably decreasing the value of the traffic parameter so as to obtain a necessary and minimum quality allowed by the application when the service quality required by the application cannot be provided in a current remaining bandwidth of the integrated network under control of the value of the traffic parameter.

According to another aspect of the present invention, a QoS control middleware in an integrated network QoS control system including a bandwidth-guaranteed network and a bandwidth-not-guaranteed network, comprises a use bandwidth registration table for recording a remaining bandwidth of each of the bandwidth-guaranteed network, the bandwidth-not-guaranteed network, and the integrated network and comprehensively managing a bandwidth of the integrated network; a remaining bandwidth table capturer for capturing data representing a usable remaining bandwidth of the bandwidth-guaranteed network from a remaining bandwidth table on the bandwidth-guaranteed network; a network status monitor for monitoring a traffic status of the bandwidth-not-guaranteed network and issuing the traffic information; a traffic candidate table for recording a candidate value for a traffic parameter which is stepwise decreased; and a QoS manager performing for recording the remaining bandwidth of the bandwidth-guaranteed network captured by the remaining bandwidth table capturer and the remaining bandwidth of the bandwidth-not-guaranteed network calculated with traffic information notified by the network status monitor, to the use bandwidth registration table mathematically converting a QoS parameter received from an application via a QoS request receiver into a traffic parameter, notifying the application of the traffic parameter, controlling the value of the traffic parameter so as to adapt a service quality required by the application, and controllably stepwise decreasing the value of a traffic parameter, by referring to the traffic candidate table, when the service quality required by the application cannot be provided in a current remaining bandwidth of the integrated network under control of the value of the traffic parameter.

According to still another aspect of the present invention, a QoS control method in an integrated network including a bandwidth-guaranteed network and a bandwidth-not-guaranteed network, comprises the steps of capturing a remaining bandwidth of the bandwidth-guaranteed network; obtaining a remaining bandwidth of the bandwidth-not-guaranteed network based on traffic information of the bandwidth-not-guaranteed network; managing and controlling the bandwidth and QoS of the integrated network based on a remaining bandwidth of the bandwidth-guaranteed network and the bandwidth of the bandwidth-not-guaranteed network, using a use bandwidth registration table, the use bandwidth registration table being used to comprehensively manage the bandwidth of the integrated network; and controlling the value of a traffic parameter so as to adapt a service quality required by an application.

Another aspect of the present invention, brings a bandwidth-not-guaranteed network terminal in an integrated network including a bandwidth-guaranteed network and a bandwidth-not-guaranteed network, to have the functions of a use bandwidth registration table for recording a remaining bandwidth of each of the bandwidth-guaranteed network, the bandwidth-not-guaranteed network, and the integrated network and comprehensively managing a bandwidth of the integrated network; a remaining bandwidth table capturer for capturing data representing a usable remaining bandwidth of the bandwidth-guaranteed network from a remaining bandwidth table on the bandwidth-guaranteed network; a network status monitor for monitoring a traffic status of the bandwidth-not-guaranteed network and issuing the traffic information; and a QoS manager performing for recording the remaining bandwidth of the bandwidth-guaranteed network captured by the remaining bandwidth table capturer and the remaining bandwidth of the bandwidth-not-guaranteed network calculated with traffic information notified by the network status monitor, to the use bandwidth registration table mathematically converting a QoS parameter received from an application via a QoS request receiver into a traffic parameter, notifying the application of said traffic parameter, controlling the value of the traffic parameter so as to adapt a service quality required by the application, and controllably decreasing the value of the traffic parameter so as to obtain a necessary and minimum quality allowed by the application when the service quality required by the application cannot be provided in a current remaining bandwidth of the integrated network under control of the value of the traffic parameter.

Further another aspect of the present invention, brings a bandwidth-not-guaranteed network terminal an integrated network including a bandwidth-guaranteed network and a bandwidth-not-guaranteed network, to have the functions of a use bandwidth registration table for recording a remaining bandwidth of each of the bandwidth-guaranteed network, the bandwidth-not-guaranteed network, and the integrated network and comprehensively managing a bandwidth of the integrated network; a remaining bandwidth table capturer for capturing data representing a usable remaining bandwidth of the bandwidth-guaranteed network from a remaining bandwidth table on the bandwidth-guaranteed network; a network status monitor for monitoring a traffic status of the bandwidth-not-guaranteed network and issuing the traffic information; a traffic candidate table for recording a candidate value for a traffic parameter which is stepwise decreased; and a QoS manager performing for recording the remaining bandwidth of the bandwidth-guaranteed network captured by the remaining bandwidth table capturer and the remaining bandwidth of the bandwidth-not-guaranteed network calculated with traffic information notified by the network status monitor, to the use bandwidth registration table mathematically converting a QoS parameter received from an application via a QoS request receiver into a traffic parameter, notifying the application of the traffic parameter, controlling the value of the traffic parameter so as to adapt a service quality required by the application, and controllably stepwise decreasing the value of the traffic parameter, by referring to the traffic candidate table, when the service quality required by the application cannot be provided in a current remaining bandwidth of the integrated network under control of the value of the traffic parameter.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention will be described below in detail by referring to the attached drawings.

Figure 1:
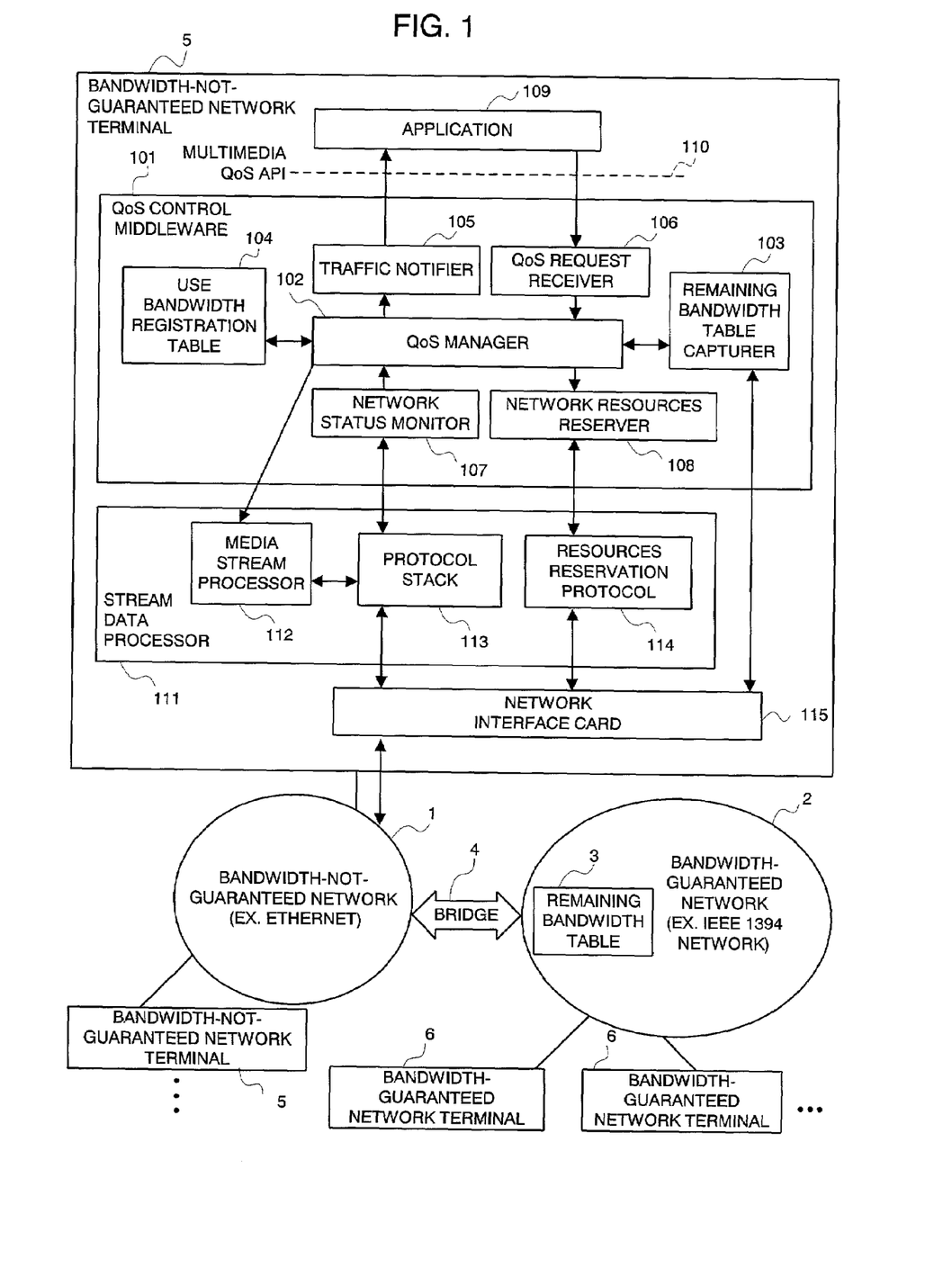
FIG. 1 is a block diagram illustrating the configuration of an integrated network QoS control system according to a first embodiment of the present invention.

First Embodiment:

FIG. 1 is a block diagram illustrating an integrated network QoS control system according to a first embodiment of the present invention.

Referring to FIG. 1, the integrated network QoS control system consists of a bandwidth-not-guaranteed network 1 (for example, Ethernet), a bandwidth-guaranteed network 2 (for example, IEEE 1394 network) having a remaining bandwidth table 3, a bridge 4, a bandwidth-not-guaranteed network terminal 5 being a terminal on the bandwidth-not-guaranteed network 1, and a bandwidth-guaranteed network terminal 6 being a terminal on the bandwidth-guaranteed network 2.

The bandwidth-not-guaranteed network terminal 5 includes a QoS control middleware 101, an application 109, a multimedia QoS API 110, a stream data processor 111, and a network interface card 115. The stream data processor 111 has a media stream processor 112, a protocol stack 113, and a resources reservation protocol 114.

The QoS control middleware 101 manages and controls the bandwidth and QoS of an integrated network including the bandwidth-not-guaranteed network 1 and the bandwidth-guaranteed network 2.

The QoS control middleware 101 includes a QoS manager 102, a remaining bandwidth table capturer 103, a use bandwidth registration table 104, a traffic notifier 105, a QoS request receiver 106, a network status monitor 107, and a network resources reserver 108.

The QoS manager 102 manages the whole operation of the QoS control middleware 101.

The remaining bandwidth table capturer 103 captures data in the remaining bandwidth table 3 existing in the bandwidth-guaranteed network 2 via the network interface card 115. The QoS manager 102 records data in the table format on the use bandwidth registration table 104 stored in, for example, a memory.

The use bandwidth registration table 104 holds data captured by the remaining bandwidth table capturer 103 and the remaining bandwidth of the bandwidth-not-guaranteed network 1 in a table format on, for example, a memory and comprehensively manages them.

The traffic notifier 105 notifies the application 109 of traffic parameters (such as a packet occurrence frequency and a maximum packet length). The traffic parameter is obtained by converting a QoS parameter (such as a maximum delay time or a minimum throughput) received by the QoS manager 102 from the application 109 via the multimedia QoS API 110 and via the QoS request receiver 106). The QoS manager 102 mathematically converts the QoS parameter into a traffic parameter.

The QoS request receiver 106 receives a data transmission/reception request and a QoS parameter from the application 109. There are as a QoS parameter a maximum error rate, jitter (variation of delay), and the like, in addition to a maximum delay time and a minimum throughput.

The network status monitor 107 monitors the traffic status of the bandwidth-not-guaranteed network 1 via the protocol stack 113 and the network interface card 115 and then notifies the QoS manager 102 of the traffic information.

The network resources reserver 108 reserves a reservation requested bandwidth on the bandwidth-not-guaranteed network 1 via the resources reservation protocol 114 and the network interface card 115, based on a bandwidth reservation request from the Qos manager 102.

The application 109, which is an application of supplying a stream data transmission service to a user, performs transmission/reception of data with the QoS control middleware 101 via the multimedia QoS API 110.

The multimedia QoS API 110 is an interface for software connecting the QoS control middleware 101 and the application 109. API means an application interface.

The stream data processor 111 processes a message or a stream of data (e.g. moving image data) based on a data transmission/reception request from the application 109 and performs transmission/reception of data with the network interface card 115.

In the stream data processor 111, the media stream processor 112 compresses or expands data to be transmitted to the integrated network, which is required by the application 109. The media stream processor 112 communicates with the bandwidth-not-guaranteed network terminal 5 on the bandwidth-not-guaranteed network 1 and the bandwidth-guaranteed network terminal 6 on the bandwidth-guaranteed network 2, via the protocol stack 113 and the network interface card 115. Alternately, the media stream processor 112 communicates with the bandwidth-not-guaranteed network terminal 5 on the bandwidth-not-guaranteed network 1 or with the bandwidth-guaranteed network terminal 6 on the bandwidth-guaranteed network 2, via the protocol stack 113 and the network interface card 115.

In the configuration of FIG. 1, the media stream processor 112, the protocol stack 113, the resources reservation protocol 114, the network interface card 115 and the bridge 4 are well known as a general constituent element by persons skilled in the art. Hence, the duplicate explanation will be omitted here.

Figure 2:
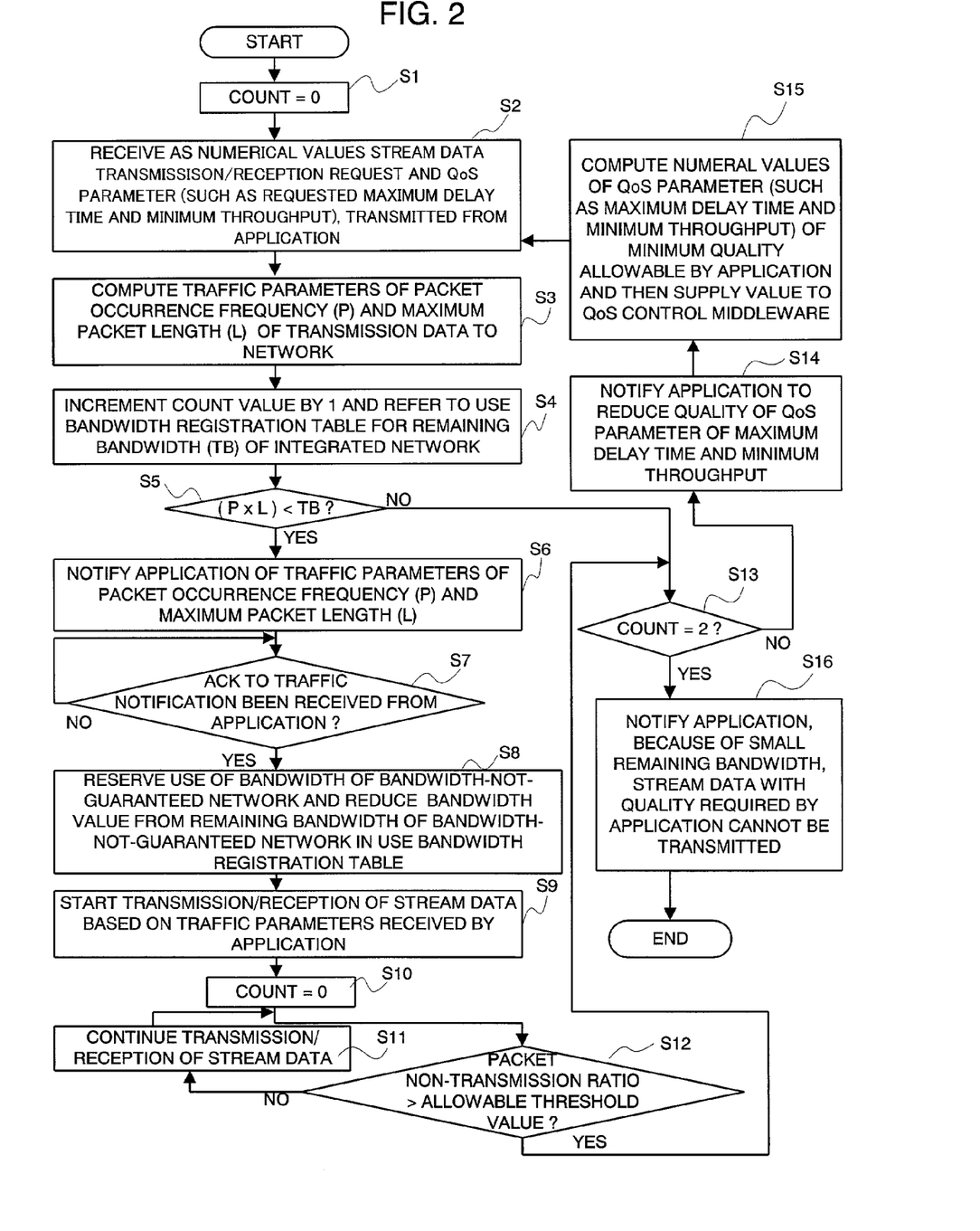
FIG. 2 is a flowchart showing the process of the integrated network QoS control system in FIG. 1.

FIG. 2 is a flowchart of a process in an integrated network QoS control system, according to the present embodiment. This process includes the step S1 of setting a first COUNT 0, the step S2 of receiving a stream data transmission/reception request and a QoS parameter, the step S3 of computing a traffic parameter, the step S4 of increasing COUNT and referring to TB, the step S5 of comparing and deciding a (P×L) and TB, the step S6 of notifying a traffic parameter, the step S7 of receiving and deciding ACK, the step S8 of subtracting a remaining bandwidth, the step S9 of starting transmission/reception of stream data, the step S10 of setting a second COUNT 0, the step S11 of continuing transmission/reception of stream data, the step S12 of comparing and deciding a packet non-transmission rate and allowable threshold value, the step S13 of deciding a COUNT 2, the step S14 of notifying about reduction of a QoS parameter quality, the step S15 of changing and supplying a QoS parameter change, and the step S16 of notifying about no transmission of stream data.

Figure 3:
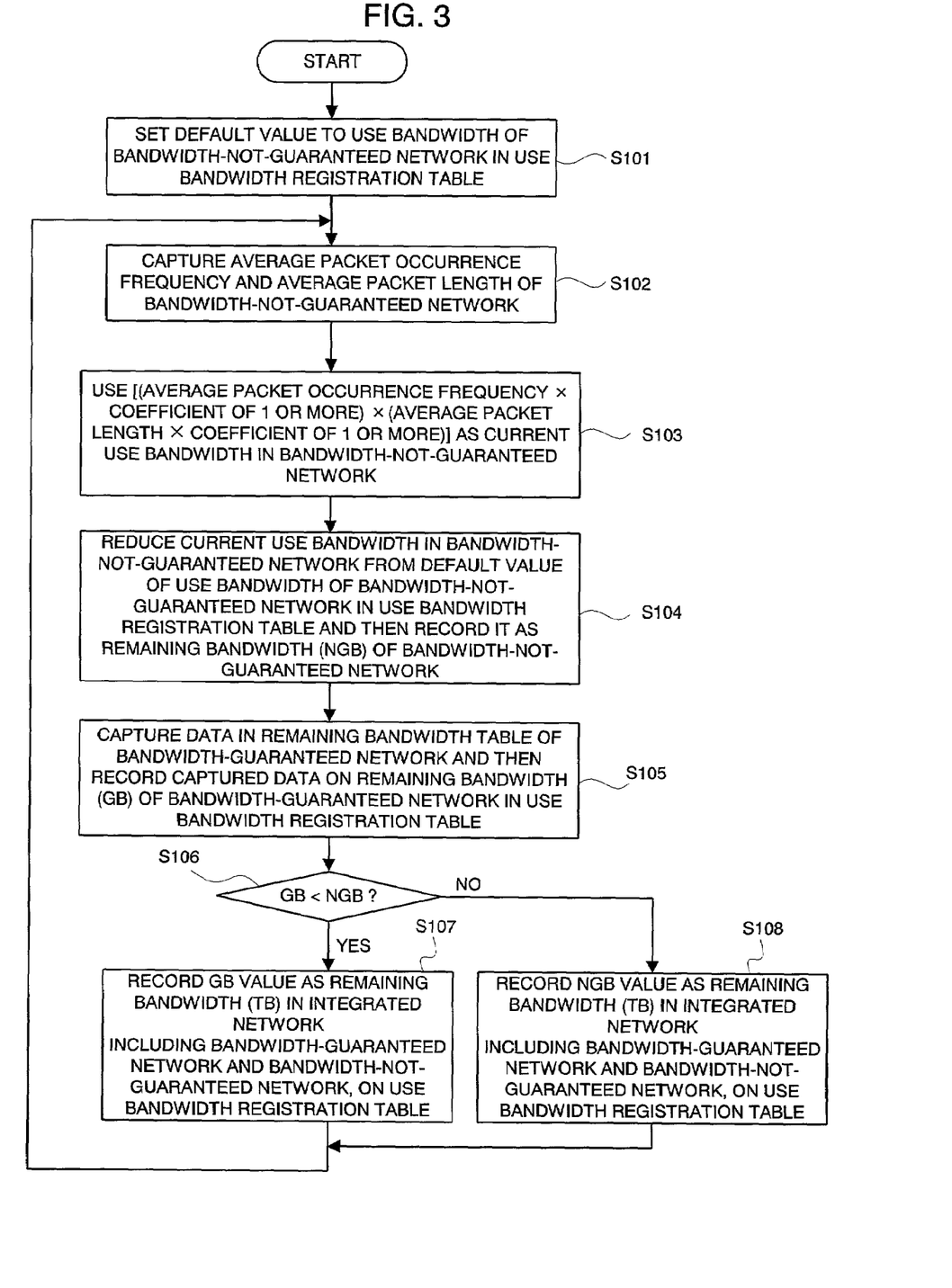
FIG. 3 is a flowchart showing the process of setting (recording) TB on a use bandwidth registration table, seen in the step S4 of increasing COUNT and referring to TB in FIG. 2 and in the step S202 of referring to TB in FIG. 5.

FIG. 3 is a flowchart showing the process of setting (recording) a remaining bandwidth (TB) of an integrated network to be referred to the step S4 of increasing COUNT and referring to TB in FIG. 2 (corresponding to the TB reference step S202 in FIG. 5 to be described later), to the use bandwidth registration table 104. This step includes the step 101 of setting a use bandwidth default value of a bandwidth-not-guaranteed network, the step S102 of capturing an average occurrence frequency and an average packet length, the step S103 of computing a current use bandwidth, the step S104 of recording NGB, the step S105 of recording GB, the step S106 of comparing and deciding GB and NGB, the step S107 of recording TB on a GB value use bandwidth registration table TB, and the step S108 of recording TB on an NGB value use bandwidth registration table TB.

Next, the entire operation of an integrated network QoS control system with the above-mentioned configuration according to the present embodiment will be described in detail below by referring to FIGS. 1 to 3.

The QoS control middleware 101 operates as follows (see FIG. 2).

First, the QoS manager 102 sets a count value managed by itself ("COUNT" in FIG. 2) to 0 (the step S1 in FIG. 2).

The QoS manager 102 receives from the application 109 a request for transmitting and receiving stream data (such moving image data) and a QoS parameter (represented in numerical values) such as a maximum delay time and a minimum throughput required in transmission/reception of the stream data, via the QoS request receiver 106 (step S2).

The QoS manager 102 mathematically converts the QoS parameter into traffic parameters including the packet occurrence frequency (P) and the maximum packet length (L) of transmission data sent to a network (step S3). The QoS manager 102 increments the COUNT value by 1 and refers to the use bandwidth registration table 104 for the remaining bandwidth (TB) of an integrated network including the bandwidth-not-guaranteed network 1 and the bandwidth-guaranteed network 2 (step S4).

Next, the Qos manager 102 compares the product (P×L) of a packet occurrence frequency (P) and a maximum packet length (L) with the remaining bandwidth (TB) of the integrated network obtained in the step S4 and then decides the sizes of both (step S5).

When (P×L)<TB in the step S5, the QoS manager 102 notifies the application 109 of the packet occurrence frequency (P) and the maximum packet length (L) as traffic parameters, via the traffic notifier 105 (step S6).

The QoS manager 102 decides whether or not an acknowledgement (referred to as "ACK") in response to a traffic parameter notification (traffic notification) to the application 109 in the step S6 has been received from the application 109 (step S7).

When that ACK has been received in the step S7 is judged, the QoS manager 102 sends an instruction for bandwidth use reservation (a bandwidth reservation request) to the network resources reserver 108. By doing so, the network resources reserver 108 reserves the use of the bandwidth of the bandwidth-not-guaranteed network 1 via the resources reservation protocol 114 and the network interface card 115. The QoS manager 102 subtracts the use bandwidth value from the remaining bandwidth value of the bandwidth-not-guaranteed network 1 of the use bandwidth registration table 104 (step S8).

When it is decided that ACK has not been received in the step S7, the QoS manager 102 waits until ACK is received (step S7).

The application 109 starts transmitting and receiving stream data such as moving image data, based on the traffic parameter (the traffic parameter notified in the step S6) received from the traffic notifier 105 (step S9).

Thus, the QoS manager 102 sets the COUNT value to 0 (step S10).

Of sets of traffic information on the bandwidth-not-guaranteed network 1 supplied from the network status monitor 107 (that is, sets of traffic information captured by the network status monitor 107 via the protocol stack 113 and the network interface card 115), the QoS manager 102 compares a packet non-transmission rate with a predetermined allowable threshold value and then decides whether or not the allowable threshold value is smaller (step S12).

While the decisional result in the step S12 is an allowable threshold value having the value of a packet non-transmission rate or more, the application 109 continuously transmits and receives the stream data initiated in the step S9 (step S11).

When deciding that (P×L)>TB in the step S5 or that an allowable threshold value is smaller than the value of a packet non-transmission rate in the step S12, the QoS manager 102 checks (decides) whether or not the COUNT value is 2 (step S13).

When deciding that a COUNT value is not 2 in the step S13, the QoS manager 102 notifies the application 109 of an instruction of lowering the quality of a QoS parameter including a maximum delay time and a minimum throughput (step S14).

When receiving a request for lowering the quality of a QoS parameter issued from the QoS control middleware 101 (the QoS manager 102), the application 109 computes the numerical value of a QoS parameter (such as a maximum delay time and a minimum throughput) having an allowable necessary and minimum quality and then supplies it to the QoS control middleware 101 (step S15). Thus, the QoS control middleware 101 can receive the QoS parameter from the application 109 in the step S2, using the value of the QoS parameter.

When it is decided that the COUNT value is 2 in the step S13, the remaining bandwidth is small. Hence, the QoS manager 102 notifies the application 109 that stream data with a quality required by the application 109 cannot be transmitted (step S16).

Next, the recording operation to the use bandwidth registration table 104, being a precondition for the operation of obtaining (referring to) the remaining bandwidth (TB) of an integrated network in the step S4 of FIG. 2 will be explained by referring to the flowchart in FIG. 3.

The QoS manager 102 sets a default value to the use bandwidth (usable bandwidth) of the bandwidth-not-guaranteed network 1 in the use bandwidth registration table 104 (step S101 in FIG. 3).

The network status monitor 107 captures an average packet occurrence frequency and an average packet length of the bandwidth-not-guaranteed network 1 via the protocol stack 113 and the network interface card 115 and then supplies them to the QoS manager 102 (step S102).

The QoS manager 102 uses as a current use bandwidth of the bandwidth-not-guaranteed network 1 the product of a first product and a second product (step S103). The first product is (an average packet occurrence frequency obtained in the step S102×a predetermined coefficient of 1 or more), for example $(1+A\sigma 1)$ (where σ1 is a standard deviation of an average packet occurrence frequency obtained in the step S102 and A is 0 or more changed over time). The second product is (an average packet length obtained in the step S102 X a predetermined coefficient of 1 or more), for example, $(1+B\sigma 2)$ (where σ2 is a standard deviation of an average packet length obtained in the step S102 and B is 0 or more changed over time).

The product of (an average packet occurrence frequency obtained in the step S102×a predetermined coefficient of 1 or more) takes up to a maximum value of a packet occurrence frequency on the bandwidth-not-guaranteed network 1. The product of (an average packet length obtained in the step S102×a predetermined coefficient of 1 or more) takes up to a maximum packet length on the bandwidth-not-guaranteed network 1.

The QoS manager 102 subtracts a current use bandwidth of the bandwidth-not-guaranteed network 1 obtained in the step S103 from the default value of a use bandwidth of the bandwidth-not-guaranteed network 1 in the use bandwidth registration table 104. Then the QoS manager 102 records the difference (subtraction result) as a remaining bandwidth (referred to as "NGB") of the bandwidth-not-guaranteed network 1 in the use bandwidth registration table 104 (step S104).

Moreover, the QoS manager 102 acquires data on the remaining bandwidth table 3 of the bandwidth-guaranteed network 2 via the remaining bandwidth table capturer 103 and then records the remaining bandwidth of the bandwidth guaranteed-type network 2 (refereed to as "GB") in the use bandwidth registration table 104 (step S105).

The QoS manager 102 compares the NGB value and the GB value (step S106). When judging that GB<NGB, the QoS manager 102 records the GB value as a remaining bandwidth (TB) in the integrated network (including the bandwidth-guaranteed network 2 and the bandwidth-not-guaranteed network 1), in the use bandwidth registration table 104 (step S107).

When deciding that GB>NGB or GB=NGB in the step S106, the QoS manager 102 records the NGB value as TB in the use bandwidth registration table 104 (step S108).

When the process in the step S107 or S108 is completed, the flow changes again to the process in the step S102 (thus, the operation of recording the GB or NGB value as TB in the use bandwidth registration table 104 is repeated).

The step S4 of referring to TB in FIG. 2 is realized by referring to TB recorded in the use bandwidth registration table 104.

Figure 4:
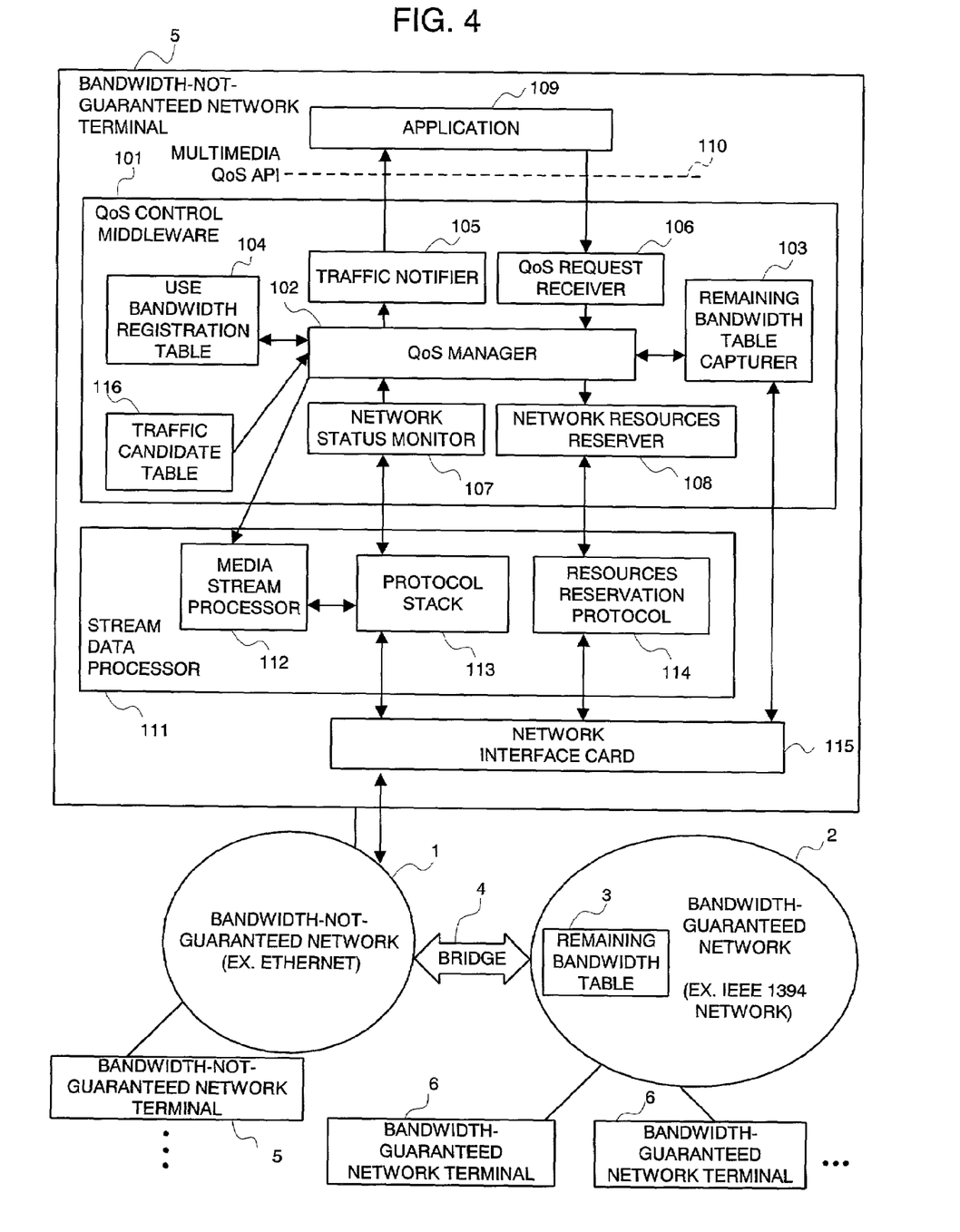
FIG. 4 is a block diagram illustrating an integrated network QoS control system according to a second embodiment of the present invention.

Second Embodiment:

FIG. 4 is a block diagram illustrating the configuration in an integrated network QoS control system according to the second embodiment of the present invention.

Referring to FIG. 4, the integrated network QoS control system includes a bandwidth-not-guaranteed network 1 (e.g. Ethernet), a bandwidth-guaranteed network 2 having a remaining bandwidth table 3 (e.g. IEEE 1394 network), a bridge 4, bandwidth-not-guaranteed network terminals 5 being a terminal on the bandwidth-not-guaranteed network 1, and bandwidth-guaranteed network terminals 6 on the bandwidth-guaranteed network 2.

Each bandwidth-not-guaranteed network terminal 5 includes a QoS control middleware 101, an application 109, a multimedia QoS API 110, a stream data processor 111, and a network interface card 115. The stream data processor 111 has a media stream processor 112, a protocol stack 113, and a resources reservation protocol 114.

The QoS control middleware 101 manages and controls the bandwidth and QoS of an integrated network including the bandwidth-not-guaranteed network 1 and the bandwidth-guaranteed network 2.

The QoS control middleware 101 includes a QoS manager 102, a remaining bandwidth table capturer 103, a use bandwidth registration table 104, a traffic notifier 105, a QoS request receiver 106, a network status monitor 107, a network resources reserver 108, and the traffic candidate table 116.

Compared with the first embodiment, the integrated network QoS control system of the second embodiment is more improved in the operation (process) during which the service quality (shown with a QoS parameter) required by the application 109 cannot be provided with a current remaining bandwidth of the integrated network.

In this embodiment, the traffic candidate table 116 is added, as shown in FIG. 4.

In the first embodiment, when the service (with a service quality required by the application 109) cannot be provided, the traffic parameter value is extremely decreased to obtain a necessary and minimum quality allowed by the application 109. In contrast, in the present embodiment, the traffic parameter value is stepwise decreased. The traffic candidate table 116 records candidate values of traffic parameters each for stepwise decreasing a traffic parameter value on a memory, for example, in tabular format. The traffic candidate table 116 supplies the candidate value of a traffic parameter to the QoS manager 102, in accordance with a request by the QoS manager 102.

Figure 5:
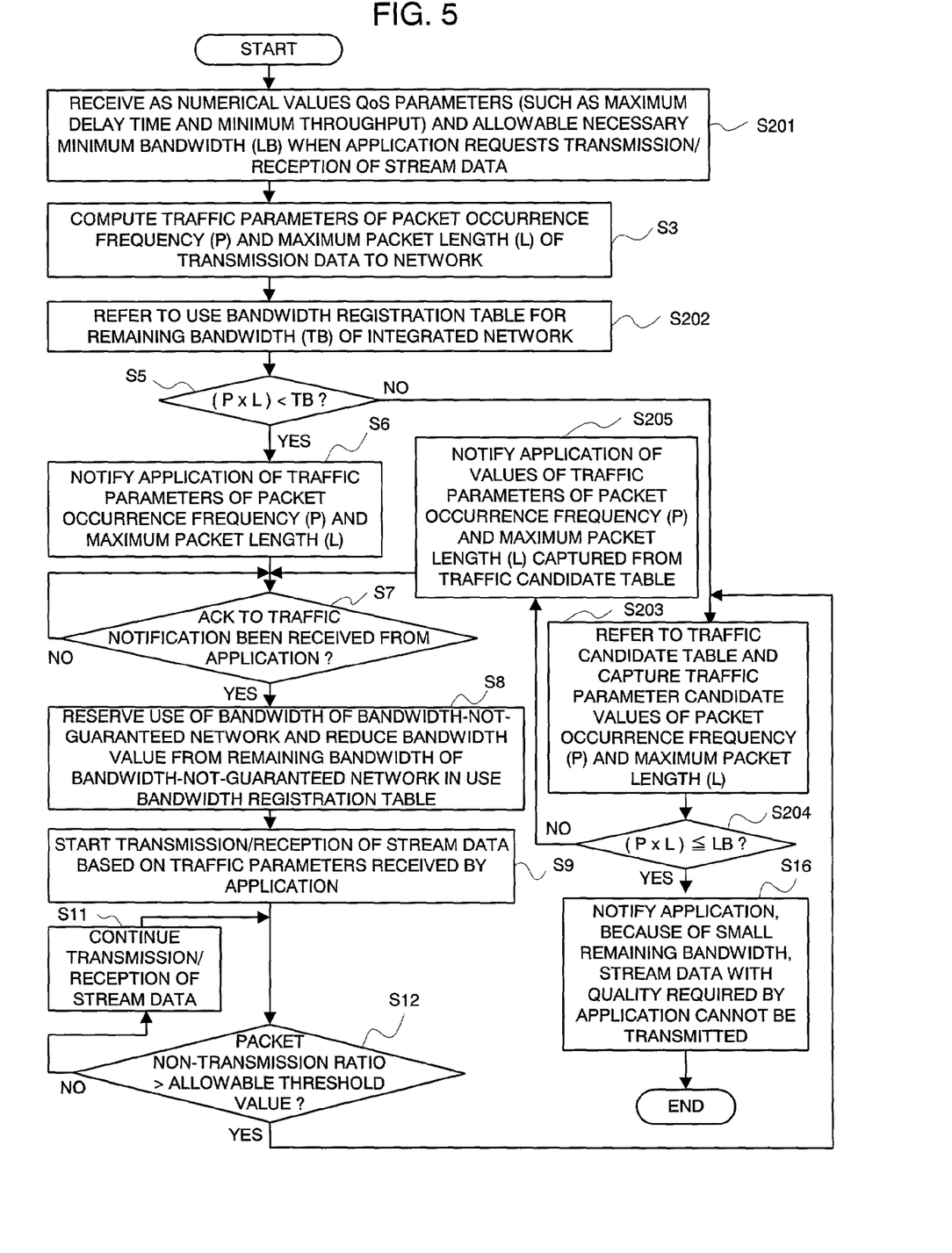
FIG. 5 is a flowchart showing the process of the integrated network QoS control system in FIG. 4.

FIG. 5 is a flowchart showing the process in an integrated network QoS control system according to the second embodiment. This process includes the step S201 of receiving a stream data transmission/reception request, a QoS parameter, and LB, the step S3 of computing a traffic parameter, the step S202 of referring to TB, the step S5 of comparing and deciding (P×L) and TB, the step S6 of notifying a traffic parameter, the step S7 of receiving and deciding ACK, the step S8 of subtracting a remaining bandwidth, the step S9 of starting transmission/reception of stream data, the step S11 of continuing transmission/reception of stream data, the step S12 of comparing and deciding a packet non-packet rate and an allowable threshold value, the step S203 of capturing a traffic parameter candidate value, the step S204 of comparing and deciding (P×L) and LB, the step S205 of notifying a traffic parameter, and the step S16 of notifying about no transmission of stream data.

FIG. 3 corresponds to the flowchart showing the process of setting (recording) the remaining bandwidth (TB) of an integrated network to the use bandwidth registration table 104 in the TB reference step S202 of FIG. 5.

In the step S2 (FIG. 2) according to the first embodiment, the QoS control middleware 101 receives QoS parameters (such as a maximum delay time and a minimum throughput) sent from the application 109.

In contrast, in the second embodiment, an allowable necessary and minimum bandwidth (LB) is received as a numerical value, in addition to the QoS parameter (S201 in FIG. 5).

In the first embodiment, the application 109 computes the numerical values of an allowable maximum delay time and an allowable minimum throughput in the steps S14 and S15 of FIG. 2 and then supplies each value as a QoS parameter to the QoS control middleware 101.

In contrast, in the second embodiment, the QoS manager 102 in the QoS control middleware 101 looks up the traffic candidate table 116 and captures a traffic parameter candidate value of a packet occurrence frequency (P) and a traffic parameter candidate value of a maximum packet length (L) (S203). Moreover, the QoS manager 102 compares the product of two candidate values with a necessary and minimum bandwidth (LB) allowable by the application 109 and then decides the difference (step S204).

When deciding that the necessary and minimum bandwidth (LB) allowable by the application 109 is smaller in the step S204, the QoS manager 102 notifies the application 109 of traffic parameter values such as a packet occurrence frequency (P) and a maximum packet length (L), captured by referring to the traffic candidate table 116 in the step S203 (step S205).

When deciding that the necessary and minimum bandwidth (LB) allowable by the application 109 is (P×L) or more in the step S204, the QoS manager 102 moves to the step S16. Then, the QoS manager 102 notifies the application 109 that stream data with the quality required by the application 109 cannot be transmitted because of the small remaining bandwidth.

In the second embodiment, whether or not the QoS control middleware 101 has sent to the application 109 the traffic parameter value corresponding to the necessary and minimum bandwidth (LB) allowable by the application 109 is checked in the step S204 of FIG. 5. This operation eliminates the adjustment of a counter (COUNT) value in FIG. 2. Consequently, the operation in the second embodiment allows the operations (processes) in the steps S1, S10, and S13 shown in FIG. 2 (according to the first embodiment) to be omitted, as shown in FIG. 5 (even in the step S202, the step S4 of increasing the COUNT value is unnecessary).

Operations other than the particular operation in the second embodiment are similar to those in the first embodiment.

In the second embodiment described above, when the service quality (represented as a QoS parameter) required by the application 109 cannot be provided in a current remaining bandwidth in the integrated network, the traffic parameter value is stepwise reduced to obtain a necessary and minimum quality allowable by the application 109, without being extremely reduced. In order to realize such a control, the traffic candidate table 116, on which candidate values for traffic parameters are recorded, in tabular format, on, e.g. a memory, is added as a constituent element. This configuration allows the bandwidth of a network to be effectively used broadly, compared with the first embodiment.

Figure 6:
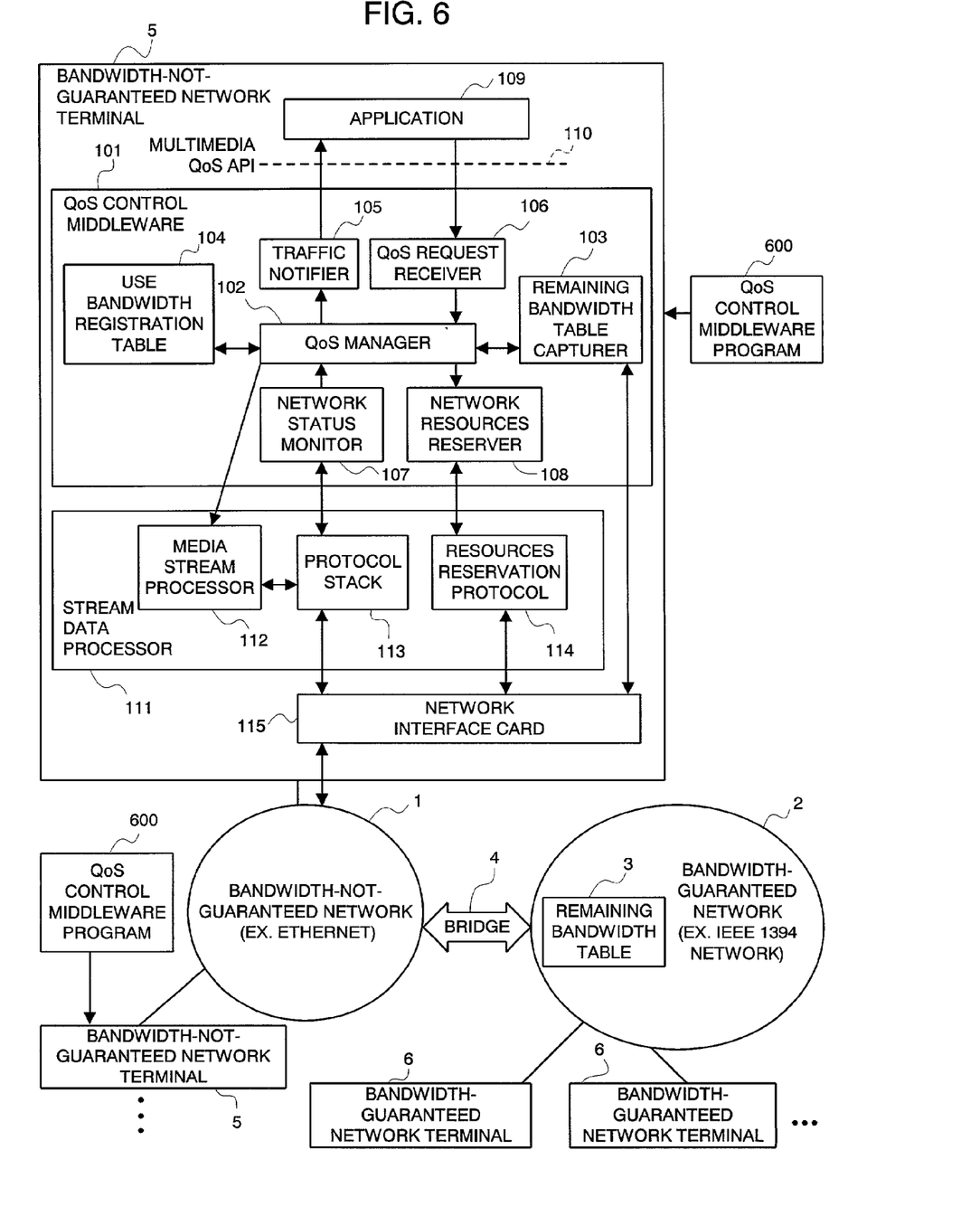
FIG. 6 is a block diagram illustrating the configurations of an integrated network QoS control system according to a third embodiment of the present invention.

Third Embodiment:

FIG. 6 is a block diagram illustrating the configuration of an integrated network QoS control system according to a third embodiment of the present invention.

Referring to FIG. 6, the integrated network QoS control system of the third embodiment differs from that in the first embodiment in that the QoS control middleware program 600 is provided.

The QoS control middleware program 600 is loaded to the bandwidth-not-guaranteed network terminal 5. The QoS control middleware program 600 acts as a QoS control middleware 101 to control the operation of the bandwidth-not-guaranteed network terminal 5. The QoS middleware 101 includes a QoS manager 102, a remaining bandwidth table capturer 103, a use bandwidth registration table 104, a traffic notifier 105, a QoS request receiver 106, a network status monitor 107, and a network resources reserver 108. The operation of the QoS control middleware 101 in the bandwidth-not-guaranteed network terminal 5 under control of the QoS control middleware program 600 is similar to that in the first embodiment. Hence, the duplicate explanation will be omitted here.

Figure 7:
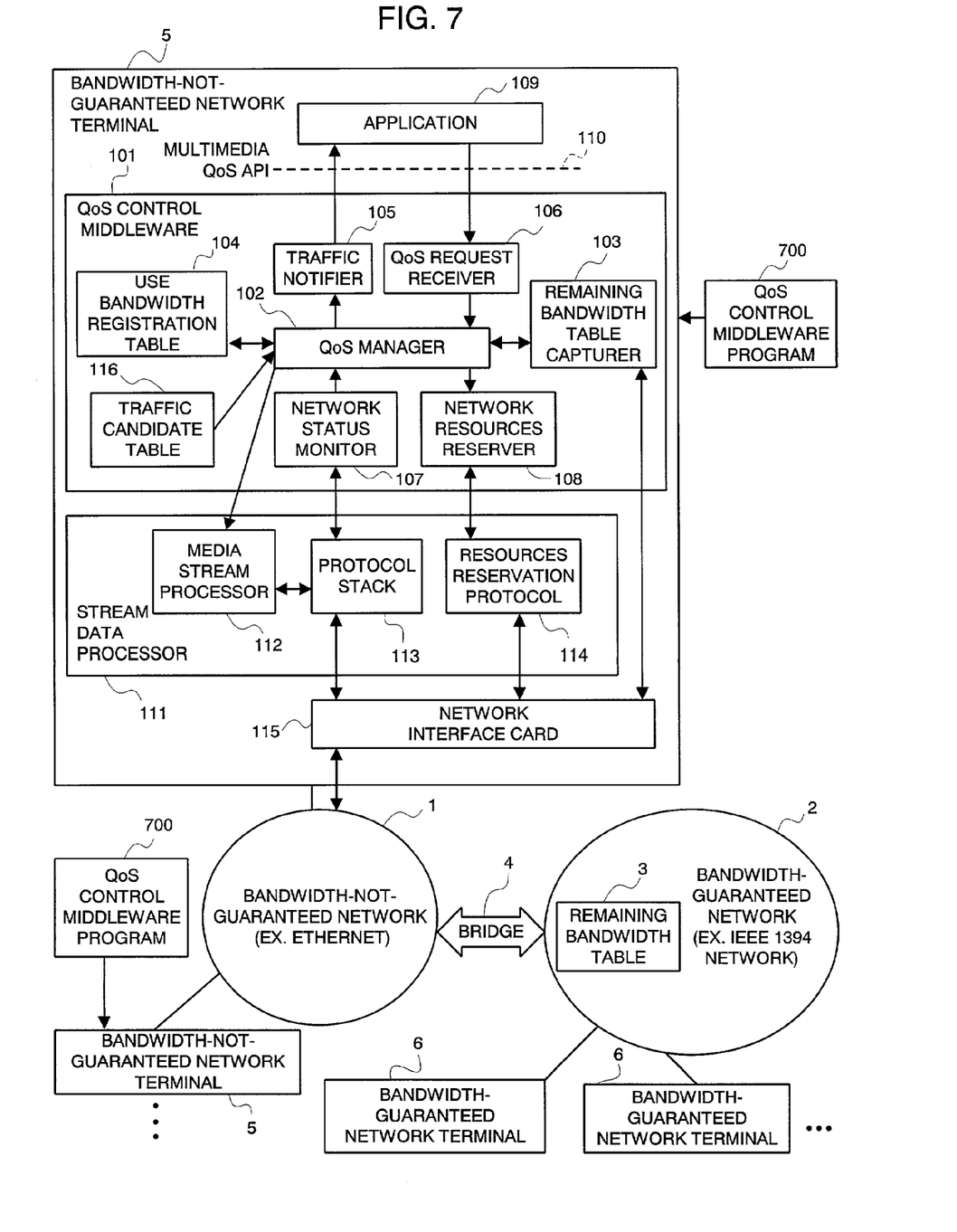
FIG. 7 is a block diagram illustrating the configurations of an integrated network QoS control system according to a fourth embodiment of the present invention.

Fourth Embodiment:

FIG. 7 is a block diagram illustrating the configuration of an integrated network QoS control system according to a fourth embodiment.

Referring to FIG. 7, the integrated network QoS control system of the fourth embodiment differs from that in the second embodiment (FIG. 4) in that a QoS control middleware program 700 is provided.

The QoS control middleware program 700 is loaded to the bandwidth-not-guaranteed network terminal 5. The QoS control middleware program 700 acts as the QoS control middleware 101 to control the operation of the bandwidth-not-guaranteed network terminal 5. The QoS control middleware 101 includes a QoS manager 102, a remaining bandwidth table capturer 103, a use bandwidth registration table 104, a traffic notifier 105, a QoS request receiver 106, a network status monitor 107, a network resources reserver 108, and a traffic candidate table 116. The operation of the QoS control middleware 101 in the bandwidth-not-guaranteed network terminal 5 under control of the QoS control middleware program 700 is similar to that in the second embodiment. Hence, the duplicate explanation will be omitted here.

The present invention has the following advantages.

That is, when communications are conducted between a terminal connected on a bandwidth-guaranteed network (or a bandwidth-guaranteed network terminal) and a terminal connected to a bandwidth-not-guaranteed network (or a bandwidth-not-guaranteed network terminal), the QoS control middleware manages and controls the bandwidth and QoS of the bandwidth-not-guaranteed network. Hence, stream data such as moving image data can be transmitted in real time in an integrated network including a bandwidth-guaranteed network and a bandwidth-not-guaranteed network.

Moreover, since the QoS control middleware is separated from the communication protocol stack or the resources reservation protocol, stream data can be transmitted in real time, without depending on a specific protocol or a specific data format.

The entire disclosure of Japanese Patent Application No. 2001-098456 filed on Mar. 30, 2001 including specification, claims, drawings and summary are incorporated herein by reference in its entirely.

What is claimed is:

1. A QoS control middleware, said QoS control middleware stored on a computer readable medium, executable by a computer, in an integrated network including a bandwidth-guaranteed network, and a bandwidth-not-guaranteed network, said QoS control middleware comprising:

a use bandwidth registration table for recording a remaining bandwidth of said integrated network including remaining bandwidths for each of said bandwidth-guaranteed network and said bandwidth-not-guaranteed network, and for comprehensively managing a bandwidth of said integrated network;

a remaining bandwidth table capturer for capturing data representing a usable remaining bandwidth of said bandwidth-guaranteed network from a remaining bandwidth table on said bandwidth-guaranteed network;

a network status monitor for monitoring a traffic status of said bandwidth-not-guaranteed network and issuing the traffic information; and a QoS manager performing operations for:

recording the remaining bandwidth of said bandwidth-guaranteed network captured by said remaining bandwidth table capturer and the remaining bandwidth of said bandwidth-not-guaranteed network calculated with traffic information notified by said network status monitor to said use bandwidth registration table, mathematically converting a QoS parameter received from an application via a QoS request receiver into a traffic parameter, notifying said application of said traffic parameter, controlling the value of said traffic parameter so as to adapt a service quality required by said application, and controllably decreasing the value of the traffic parameter so as to obtain a necessary and minimum quality allowed by said application when the service quality required by said application cannot be provided in a current remaining bandwidth of said integrated network under control of the value of said traffic parameter.

2. The QoS control middleware defined in claim 1, further comprising, for when said application implements a step of providing notification about the beginning of transmission/reception of stream data, a step of continuing transmission/reception of stream data, a step of changing a QoS parameter, and a step of supplying a QoS parameter, means for setting a first COUNT 0;

means for requesting a stream data transmission/reception;

means of receiving a QoS parameter;

means for computing a traffic parameter;

means for increasing a COUNT value;

means for referring to a remaining bandwidth of said integrated network;

means for comparing and deciding (a packet occurrence frequency×a maximum packet length) and the remaining bandwidth of said integrated network;

means for notifying a traffic parameter;

means for determining reception of ACK;

means for subtracting a remaining bandwidth;

means for setting a second COUNT 0;

means for comparing and deciding a packet non-transmission rate and an allowable threshold value;

means for deciding the COUNT 2;

means for notifying a reduction of the quality of a QoS parameter; and means for notifying about no transmission of stream data.

3. The QoS control middleware defined in claim 2, further comprising:
- means for setting a use bandwidth default value of said bandwidth-not-guaranteed network;
- means for capturing an average packet occurrence frequency and an average packet length;
- means for computing a current use bandwidth;
- means for recording a remaining bandwidth of said bandwidth-not-guaranteed network and a remaining bandwidth of said bandwidth-guaranteed network;
- means for comparing and deciding a remaining bandwidth of said bandwidth-guaranteed network and a remaining bandwidth of said bandwidth-not-guaranteed network;
- means for recording, as a remaining bandwidth, the value of a remaining bandwidth of said bandwidth-guaranteed network on a use bandwidth registration table; and
- means for recording, as a remaining bandwidth, the value of a remaining bandwidth of said bandwidth-not-guaranteed network on the use bandwidth registration table.

4. The QoS control middleware defined in claim 1, wherein said QoS control middleware is disconnected from a protocol stack.

5. The QoS control middleware defined in claim 1, wherein said QoS control middleware is disconnected from a resources reservation protocol.

6. A QoS control middleware, said QoS control middleware stored on a computer readable medium, executable by a computer, in an integrated network QoS control system including a bandwidth-guaranteed network, and a bandwidth-not-guaranteed network, said Qos control middleware comprising:
- a use bandwidth registration table for recording a remaining bandwidth of said integrated network including remaining bandwidths for each of said bandwidth-guaranteed network and said bandwidth-not-guaranteed network, and for comprehensively managing a bandwidth of said integrated network;
- a remaining bandwidth table capturer for capturing data representing a usable remaining bandwidth of said bandwidth-guaranteed network from a remaining bandwidth table on said bandwidth-guaranteed network; and
- a network status monitor for monitoring a traffic status of said bandwidth-not-guaranteed network and issuing the traffic information;
- a traffic candidate table for recording a candidate value for a traffic parameter which is stepwise decreased; and
- a QoS manager performing operations for:
  - recording the remaining bandwidth of said bandwidth-guaranteed network captured by said remaining bandwidth table capturer and the remaining bandwidth of said bandwidth-not-guaranteed network calculated with traffic information notified by said network status monitor said use bandwidth registration table,
  - mathematically converting a QoS parameter received from an application via a QoS request receiver into a traffic parameter,
  - notifying said application of said traffic parameter,
  - controlling the value of said traffic parameter so as to adapt a service quality required by said application, and
  - controllably stepwise decreasing the value of a traffic parameter, by referring to said traffic candidate table, when the service quality required by said application cannot be provided in a current remaining bandwidth of said integrated network under control of the value of said traffic parameter.

7. The QoS control middleware defined in claim 6, further comprising, for when said application starts transmission/reception of stream data and continues transmission/reception of stream data,
- means for receiving a stream data transmission/reception request, a QoS parameter, and an allowable necessary and minimum bandwidth;
- means for computing a traffic parameter;
- means for referring to a remaining bandwidth of said integrated network;
- means for comparing and deciding (a packet occurrence frequency×a maximum packet length) and the remaining bandwidth of said integrated network;
- means for notifying a traffic parameter;
- means for determining reception of ACK;
- means for subtracting a remaining bandwidth;
- means for comparing and deciding a packet non-transmission rate and an allowable threshold value;
- means for capturing a traffic parameter candidate value;
- means for comparing and deciding (a packet occurrence frequency×a maximum packet length) and an allowable necessary and minimum bandwidth;
- means for notifying a traffic parameter; and
- means for notifying about no transmission of stream data.

8. The QoS control middleware defined in claim 7, further comprising:
- means for setting a use bandwidth default value of said bandwidth-not-guaranteed network;
- means for capturing an average packet occurrence frequency and an average packet length;
- means for computing a current use bandwidth;
- means for recording a remaining bandwidth of said bandwidth-not-guaranteed network and a remaining bandwidth of said bandwidth-guaranteed network;
- means for comparing and deciding a remaining bandwidth of said bandwidth-guaranteed network and a remaining bandwidth of said bandwidth-not-guaranteed network;
- means for recording, as a remaining bandwidth, the value of a remaining bandwidth of said bandwidth-guaranteed network on a use bandwidth registration table; and
- means for recording, as a remaining bandwidth, the value of a remaining bandwidth of said bandwidth-not-guaranteed network on the use bandwidth registration table.

9. The QoS control middleware defined in claim 6, wherein said QoS control middleware is disconnected from a protocol stack.

10. The QoS control middleware defined in claim 6, wherein said QoS control middleware is disconnected from a resources reservation protocol.

11. A QoS control method in an integrated network including a bandwidth-guaranteed network and a bandwidth-not-guaranteed network, comprising the steps of:
- capturing a remaining bandwidth of said bandwidth-guaranteed network;
- obtaining a remaining bandwidth of said bandwidth-not-guaranteed network based on traffic information of said bandwidth-not-guaranteed network;
- managing and controlling the bandwidth and QoS of said integrated network based on a remaining bandwidth of said bandwidth-guaranteed network and the remaining bandwidth of said bandwidth-not-guaranteed network, using a use bandwidth registration table, said use bandwidth registration table being used to comprehensively manage the bandwidth of said integrated network; and controlling the value of a traffic parameter so as to adapt a service quality required by an application.

12. The QoS control method defined in claim 11, wherein the step of controlling the value of said traffic parameter comprises controllably decreasing the value of said traffic parameter so as to obtain a necessary and minimum quality allowed by said application when the service quality required by said application cannot be provided in a current remaining bandwidth of said integrated network.

13. The QoS control method defined in claim 11, wherein the step of controlling the value of said traffic parameter comprises the step of controllably stepwise decreasing a candidate value for a predetermined traffic parameter when the service quality required by said application cannot be provided in a current remaining bandwidth of said integrated network.

14. A computer-readable medium tangibly embodying a program of computer readable instructions executable by a bandwidth-not-guaranteed network terminal, on an integrated network including a bandwidth-guaranteed network and a bandwidth-not-guaranteed network, to have the functions of:

a use bandwidth registration table for recording a remaining bandwidth of said integrated network including remaining bandwidths for each of said bandwidth-guaranteed network and said bandwidth-not-guaranteed network, and for comprehensively managing a bandwidth of said integrated network;

a remaining bandwidth table capturer for capturing data representing a usable remaining bandwidth of said bandwidth-guaranteed network from a remaining bandwidth table on said bandwidth-guaranteed network;

a network status monitor for monitoring a traffic status of said bandwidth-not-guaranteed network and issuing the traffic information; and a QoS manager performing operations for:

recording the remaining bandwidth of said bandwidth-guaranteed network captured by said remaining bandwidth table capturer and the remaining bandwidth of said bandwidth-not-guaranteed network calculated with traffic information notified by said network status monitor to said use bandwidth registration table, mathematically converting a QoS parameter received from an application via a QoS request receiver into a traffic parameter, notifying said application of said traffic parameter, controlling the value of said traffic parameter so as to adapt a service quality required by said application, and controllably decreasing the value of the traffic parameter so as to obtain a necessary and minimum quality allowed by said application when the service quality required by said application cannot be provided in a current remaining bandwidth of said integrated network under control of the value of said traffic parameter.

15. The program on the computer readable medium defined in claim 14, wherein said bandwidth-not-guaranteed network terminal comprises, for when said application implements a step of providing notification about the beginning of transmission/reception of stream data, a step of continuing transmission/reception of stream data, and a step of changing a QoS parameter, and a step of supplying a QoS parameter, means for setting a first COUNT 0;
means for requesting a stream data transmission/reception;
means of receiving a QoS parameter;
means for computing a traffic parameter;
means for increasing a COUNT value;
means for referring to a remaining bandwidth of said integrated network;
means for comparing and deciding (a packet occurrence frequency×a maximum packet length) and the remaining bandwidth of said integrated network;
means for notifying a traffic parameter;
means for determining reception of ACK;
means for subtracting a remaining bandwidth;
means for setting a second COUNT 0;
means for comparing and deciding a packet non-transmission rate and an allowable threshold value;
means for deciding the COUNT 2;
means for notifying a reduction of the quality of a QoS parameter; and
means for notifying about no transmission of stream data.

16. The program on the computer readable medium defined in claim 15, wherein said bandwidth-not-guaranteed network terminal comprises:

means for setting a use bandwidth default value of said bandwidth-not-guaranteed network;
means for capturing an average packet occurrence frequency and an average packet length;
means for computing a current use bandwidth;
means for recording a remaining bandwidth of said bandwidth-not-guaranteed network and a remaining bandwidth of said bandwidth-guaranteed network;
means for comparing and deciding a remaining bandwidth of said bandwidth-guaranteed network and a remaining bandwidth of said bandwidth-not-guaranteed network;
means for recording, as a remaining bandwidth, the value of a remaining bandwidth of said bandwidth-guaranteed network on a use bandwidth registration table; and
means for recording, as a remaining bandwidth, the value of a remaining bandwidth of said bandwidth-not-guaranteed network on the use bandwidth registration table.

17. A computer-readable medium tangibly embodying a program of computer readable instructions executable for brin in a bandwidth-not-guaranteed network terminal, on an integrated network including a bandwidth-guaranteed network and a bandwidth-not-guaranteed network, to have the functions of:

a use bandwidth registration table for recording a remaining bandwidth of each of said bandwidth-guaranteed network, said bandwidth-not-guaranteed network, and said integrated network and comprehensively managing a bandwidth of said integrated network;

a remaining bandwidth table capturer for capturing data representing a usable remaining bandwidth of said bandwidth-guaranteed network from a remaining bandwidth table on said bandwidth-guaranteed network; and a network status monitor for monitoring a traffic status of said bandwidth-not-guaranteed network and issuing the traffic information;

a traffic candidate table for recording a candidate value for a traffic parameter which is stepwise decreased; and a QoS manager performing operations for:

recording the remaining bandwidth of said bandwidth-guaranteed network captured by said remaining bandwidth table capturer and the remaining bandwidth of said bandwidth-not-guaranteed network calculated with traffic information notified by said network status monitor to said use bandwidth registration table mathematically converting a QoS parameter received from an application via a QoS request receiver into a traffic parameter, notifying said application of said traffic parameter, controlling the value of said traffic parameter so as to adapt a service quality required by said application, and controllably stepwise decreasing the value of the traffic parameter, by referring to said traffic candidate table, when the service quality required by said application cannot be provided in a current remaining bandwidth of said integrated network under control of the value of said traffic parameter.

18. The program on the computer readable medium defined in claim 17, wherein said bandwidth-not-guaranteed network terminal functions, when said application starts transmission/reception of stream data and continues transmission/reception of stream data, as means for receiving a stream data transmission/reception request, a QoS parameter, and an allowable necessary and minimum bandwidth;

means for computing a traffic parameter;

means for referring to a remaining bandwidth of said integrated network;

means for comparing and deciding (a packet occurrence frequency×a maximum packet length) and the remaining bandwidth of said integrated network;

means for notifying a traffic parameter;

means for determining reception of ACK;

means for subtracting a remaining bandwidth;

means for comparing and deciding a packet non-transmission rate and an allowable threshold value;

means for capturing a traffic parameter candidate value;

means for comparing and deciding (a packet occurrence frequency×a maximum packet length) and an allowable necessary and minimum bandwidth;

means for notifying a traffic parameter; and means for notifying about no transmission of stream data.

19. The program on the computer readable medium defined in claim 18, wherein said bandwidth-not-guaranteed network terminal comprises:

means for setting a use bandwidth default value of said bandwidth-not-guaranteed network;

means for capturing an average packet occurrence frequency and an average packet length;

means for computing a current use bandwidth;

means for recording a remaining bandwidth of said bandwidth-not-guaranteed network and a remaining bandwidth of said bandwidth-guaranteed network;

means for comparing and deciding a remaining bandwidth of said bandwidth-guaranteed network and a remaining bandwidth of said bandwidth-not-guaranteed network;

means for recording, as a remaining bandwidth, the value of a remaining bandwidth of said bandwidth-guaranteed network on a use bandwidth registration table; and means for recording, as a remaining bandwidth, the value of a remaining bandwidth of said bandwidth-not-guaranteed network on the use bandwidth registration table.

20. A computer-readable medium tangibly embodying a program of computer readable instructions executable for bringing a bandwidth-not-guaranteed network terminal, in an integrated network including a bandwidth-guaranteed network and a bandwidth-not-guaranteed network, to have the function of a QoS control middleware including:

capturing a remaining bandwidth of said bandwidth-guaranteed network;

computing a remaining bandwidth of said bandwidth-not-guaranteed network based on traffic information of said bandwidth-not-guaranteed network;

managing and controlling the bandwidth and QoS of said integrated network based on a remaining bandwidth of said bandwidth-guaranteed network and the bandwidth of said bandwidth-not-guaranteed network, using a use bandwidth registration table, said use bandwidth registration table being used to comprehensively manage the bandwidth of said integrated network; and controlling the value of a traffic parameter so as to adapt a service quality required by an application.

21. The program on the computer readable medium defined in claim 20, wherein the step of controlling the value of said traffic parameter comprises the step controllably decreasing so as to obtain a necessary and minimum quality allowed by said application when the service quality required by said application cannot be provided in a current remaining bandwidth of said integrated network, the value of the traffic parameter.

22. The program on the computer readable medium defined in claim 20, wherein the step of controlling the value of said traffic parameter comprises the step of controllably stepwise decreasing the value of the traffic parameter based on a candidate value for a predetermined traffic parameter when the service quality required by said application cannot be provided in a current remaining bandwidth of said integrated network.

\* \* \* \* \*